Patented May 4, 1937

2,079,208

UNITED STATES PATENT OFFICE 2,079,208

STORAGE BATTERY PLATE AND METHOD OF MAKING THE SAME

Harold Hibbert, Montreal, Quebec, Canada, and Willard L. Reinhardt, Shaker Heights, Ohio, assignors to Willard Storage Battery Company, Cleveland, Ohio, a corporation of West Virginia No Drawing. Application October 1, 1934, Serial No. 746,409

3 Claims. (Cl. 136—26)

This invention relates to storage batteries and has particular reference to the composition of the paste or active material.

The principal object of the present invention is to provide a lead compound, whether in the form of one or more oxides of lead, the paste used in making plates for batteries or the active material of the plates, which has incorporated therein and distributed therethrough an ingredient which will improve the operation or performance of the battery, especially by keeping up the capacity of the negative plates.

A number of different substances have been previously used for this purpose, as, for example, wood meal, lignin, and humic substances, all of which are naturally occurring materials associated with more or less recent vegetable life. Such materials as lignin and humic substances are generally soluble in caustic alkalies which permit of their separation from accompanying substances, such as cellulose. We have discovered that if finely divided wood or other vegetable substance (including practically all forms of plant life) is subjected to the action of an alkali, a modified lignin, which we will refer to herein as alkali lignin, is obtained. Apparently certain chemical changes occur during this treatment so that the alkali lignin thus obtained possesses different properties from those exhibited by unchanged lignin present in the original wood or other vegetable matter.

Likewise, we have discovered that if this alkali lignin is mixed with the oxide or oxides used in making the paste or the active material of storage battery plates, the efficiency and performance of the battery are greatly increased.

Our invention therefore resides in the use of alkali lignin in making the paste or active material of plates of storage batteries of the lead-acid type.

The process for producing this alkali lignin is generally the same regardless of the character of the vegetable material used, though certain minor phases of the process, such as the temperature employed and the time of treatment, vary with the kind and to an extent with the fineness of the material. The below mentioned process has been found to give very good results with the use of chipped or ground wood. Any wood may be employed, but I find that excellent results are obtained by the use of spruce. The wood, either ground or chipped, is heated with a large excess of a 5% to 10% alkaline solution, such as a caustic soda or caustic potash solution, at a temperature of about 170° C. for a period of about two (2) to four (4) hours. The alkaline solution is then filtered from the undissolved matter and is acidified with a mineral acid, such as sulphuric or hydrochloric acid. This causes the alkali lignin to be precipitated and the same is then washed with water and dried at a lower temperature. This material, which is in the form of a finely divided powder, is then ready for use by being incorporated with the oxide or oxides of lead used in making the paste.

As stated before, certain features of the process, such as the temperature and time phases, will depend upon the raw material being used. For example, when comminuted corn-cobs are used, extraction may be effected with a caustic alkali, such as those mentioned, at a relatively low temperature, such as between 20° to 60° C., while with other plant species, such as fibers and woods, higher temperatures and pressures are necessary.

The term alkali lignin, as used herein, is intended to cover all types of naturally occurring or extracted lignins which have been subjected to the action of an alkaline solution to an extent and under such conditions that modified lignin possessing the desirable properties herein mentioned is obtained. We might state at this point that it is not precisely known to what the beneficial results are attributable. It may be due to an actual chemical alteration in the structure of the lignin or to one or more ingredients in the modified lignin which have a catalytic effect when present in the active material of a battery.

Furthermore, this altered or what we term alkali lignin may be obtained from a by-product of certain industrial processes. For example, in the preparation of soda pulp, wood chips are heated with a solution of a caustic alkali under pressure, causing the lignin to be dissolved out and leaving the cellulose or soda pulp. We find that on acidifying this alkaline mother liquor, the alkali lignin is precipitated, and, when filtered, washed, and dried, can be used for our purpose to substantially the same extent as the alkali lignin when produced in the manner explained above.

In accordance with the present invention, the alkali lignin is thoroughly mixed with the oxide or oxides of lead, preferably in the proportion of about .1% to about 1% by weight, depending upon the purposes and conditions under which the battery is to be used. For batteries which are to be used under low temperature conditions, a higher percentage of the alkali lignin is employed. This new and improved activating agent performs the function of an ordinary expander, and, additionally, improves the performance of the battery by maintaining the capacity of the negative plates and otherwise. It may, if desired, be used with a small percentage of some other expander, such as barium sulphate.

Alkali lignin (with or without another expander) may be mixed with the oxide or oxides of lead as prepared by oxide manufacturers for use by manufacturers of storage batteries. Generally, however, it is incorporated in the storage battery paste and is thoroughly mixed therein. In some instances the dissolved alkali lignin might be introduced into pasted plates or into the active material of formed or charged plates and then precipitated therein in the manner described in the Reinhardt Patent No. 1,817,846.

While we have mentioned the desired proportions in the use of our improved expander or activating material, and while we have described in some detail the process by which this material can be obtained in an efficient and effective manner, we do not desire to be confined to these proportions or to the details or precise steps of the process mentioned, or to any particular raw material, but aim in our claims to cover all modifications which do not involve a departure from the spirit and scope of the invention in its broadest aspects.

Having thus described our invention, we claim:

1. A lead compound for storage battery plates having an activating material incorporated therein composed chiefly of alkali lignin.

2. The method which comprises treating a vegetable product with an alkaline solution so as to dissolve the lignin, treating the solution to cause the precipitation of the lignin in the form of alkali lignin, and incorporating the same into paste used in forming plates for storage batteries of the lead-acid type.

3. The method which comprises treating lignin or a substance containing lignin with caustic alkali so as to dissolve the lignin, acidulating the solution so as to cause the precipitation of alkali lignin, and incorporating a small amount of the same in paste for plates of storage batteries of the lead-acid type.

HAROLD HIBBERT.
WILLARD L. REINHARDT.